UNITED STATES PATENT OFFICE.

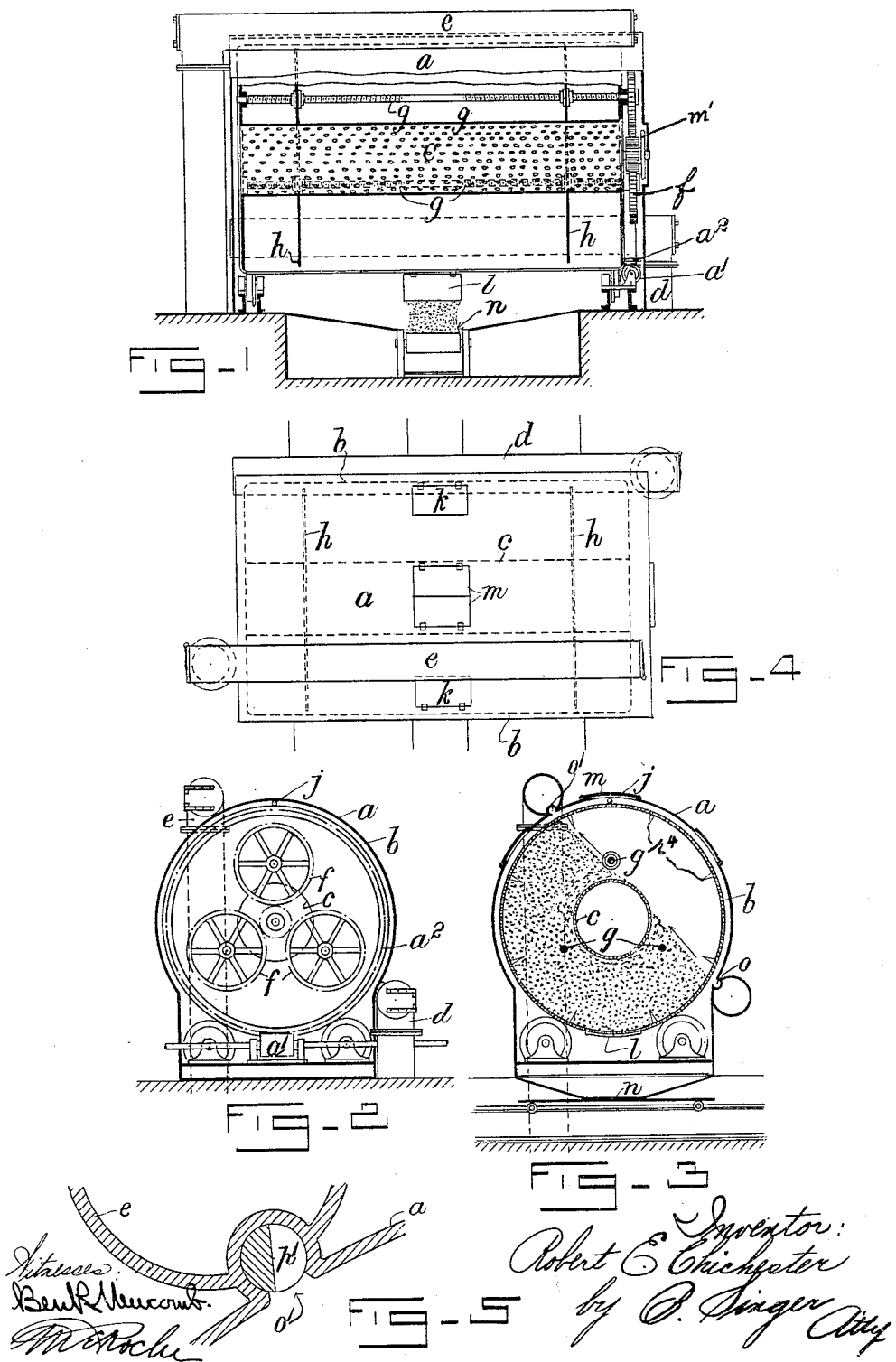

ROBERT EDWARD CHICHESTER, OF EATON, NORWICH, ENGLAND.

APPARATUS FOR PRODUCING MALT.

1,117,323.     Specification of Letters Patent.     Patented Nov. 17, 1914.

Application filed July 28, 1913. Serial No. 781,576.

*To all whom it may concern:*

Be it known that I, ROBERT EDWARD CHICHESTER, of Eaton, Norwich, England, have invented certain new and useful Improvements in Apparatus for Producing Malt, of which the following is a specification.

This invention relates to improvements in and connected with the treatment of grain in the production of malt, and has reference to the pneumatic system wherein the grain is aerated in revolving drums.

Hitherto in such systems the air has been forced more or less uniformly through the whole mass of the grain within the drums and the primary feature of my present invention consists in drawing or forcing the air or other elastic fluid across the surface of the grain so that as the drum revolves the grain running over the surface gravitates through this air or elastic fluid. The air may be either dry, moist, cool or warmed and with or without the addition of a gas or gases.

My invention further comprises an improved apparatus of the kind referred to above, adapted for carrying out a process involving the foregoing principle and in the provision in this kind of apparatus for regulating the air supply and for accommodating the increased bulk due to the growth or germination of the grain.

In the accompanying drawings I have illustrated one form of apparatus for enabling my invention to be carried into practice.

In these drawings: Figure 1 is a longitudinal sectional view. Fig. 2 is an end elevational view thereof. Fig. 3 is a cross sectional view thereof. Fig. 4 is a plan view thereof, and Fig. 5 is an enlarged view of a detail.

Referring to these drawings $a$ designates a suitable form of an outer casing which has a perforated cylindrical shell or drum $b$ centrally within it and adapted to be rotated by suitable gearing such as the worm $a^1$ and worm rack segment $a^2$ and passing longitudinally, from end to end of it, is an inner perforated tube $c$. The object of this tube is to form a baffle which will break the run of the grain, and cause it to be turned, the amount of the fall being controlled by the movable partition disks $h$ hereinafter described. The shell or drum $b$ is inclosed as aforesaid by an air-tight jacket or casing $a$ and is preferably mounted on suitable rollers. Sharp ribs such as $r^4$ are provided which project from the inner surface of the drum $b$, being rigid therewith, and which serve to prevent the grain from sliding down along the inner face of the drum $b$. The grain therefore must roll across the upper face of the inner drum $c$.

Air, either moist or dry, is admitted by means of the air inlet pipe $d$. It passes through the valve orifice $o$ and the perforated shell or drum $b$, across the surface of the grain within the shell or drum $b$ through the grain gravitating upon the surface of the bulk and thence over the surface of the grain again through the perforated shell and then through the outlet valve orifice $o$ till it finally passes away to the fan through the air outlet pipe $e$. The air inlet and outlet orifices and the means by which they are controlled are shown more or less diagrammatically in Fig. 5. The valves consist of semicircular spindles $p^1$ (see Fig. 5) which can be so turned as to increase or diminish the effective areas of the ports. The arrangement is preferably such that when the port is fully open the orifice or port is of an area less than that of the suction pipe which latter is preferably further controllable by means of some suitable form of valve. The reason why the orifice or port aforesaid should be less than the area of the suction pipe is to insure an even intake of air through the whole length of the orifice. By this means the warmth generated in the grain due to enzymic action, and also carbonic acid gas or gases resulting from germination can be dispersed or removed. Gas or gases can also be introduced or the grain aerated by means of the above arrangement. Thus the grain gravitates through a current of air, gas or gases preferably traveling in a direction opposite to its direction of motion.

The temperature of the air leaving by the pipe $e$ is the temperature of the growing grain. The drum is as aforesaid preferably provided with movable partitions or disks $h$ and these partitions are preferably mounted upon the central drum and right and left handed screws $g$ are provided passing through tapped openings in the disks $h$. Suitable gearing $f$ is provided so that the turning of these screws simultaneously will cause the partitions to move relatively to each other along the screws and thus enlarge or diminish—as the case may be—the size of the grain compartment. A hand wheel $m'$ is provided for operating the gearing $f$ to shift the disks $h$ as desired. The center tube $c$ is perforated and the casing $a$ is provided with a top charging door $m$ and a bottom emptying door. The drum $b$ is provided also with a door $l$ which serves either as a charging or emptying door according to circumstances and the position of the drum.

The apparatus is provided with a sprinkling pipe $i$ which runs from end to end longitudinally. The air-tight casing $a$ is preferably fitted with inspection doors $k$. The advantages of this system over the usual system of inducing the air to pass through the thickest part of the bulk of grain are manifold, for example the exact temperature of the grain can be ascertained, the grain in its rolling over the center due to the revolution of the drum produces a thorough mixing, the temperature of the growing grain can if desired be reduced in a shorter time thus enabling the grain to remain at a more even temperature throughout the entire length of the central air tube. Moreover by regulating the force and if necessary the temperature of the air current, the degree of aeration or cooling can be controlled.

It will be understood that the foregoing apparatus is given by way of example and may be varied within limits so long as the apparatus provided whatever its form insures the passage of the grain in a stream through a current of air or other suitable elastic fluid preferably traveling in the direction opposite to that of the grain.

The conditions under which the grain grows more nearly resembles that of floor malting. There is not danger of a partial vacuum being formed, a very important point since germination does not proceed in a vacuum. The outer shell being perforated the couch piece is able to throw off the excess of liquor quickly thus allowing germination to start a day or so earlier. The movable disks $h$ admit of more space being given the growing grain when it requires it. This corresponds to thinning a piece of the floors in floor malting. Since strong vigorous barleys, and weathered barleys, have a tendency to run to root, these require a greater turning space, while on the other hand barleys which have been warm and whose rootlets are brittle require less turning space.

The provision of movable partition disks $h$ for regulating the thickness of the grain on the center tube results also in a more perfect means being provided for thoroughly turning and mixing the grain; this is of the greatest importance when sprinkling, any chance of the grain becoming knotted is practically impossible. The temperature of the growing grain can be readily controlled because the grain gravitates in a thin stream through an opposing current of air. Less air is required to reduce the temperature of the grain, consequently, less power is required for fan purposes a point of some importance. The loss between barley and malt is less because provision is made against the formation of excessive rootlet, and the grain can be germinated at a lower temperature. The perforated shell or drum being jacketed the grain cannot get dried up through exposure to the air, moist air being introduced into the jacket, until the withering stage. The apparatus can be built to any size without altering the principle of construction. Air can be passed through the grain the whole time sprinkling is taking place, a distinct advantage in warm weather, because the grain has a tendency to run up in temperature while sprinkling whereas the grain ought to be kept cool in liquor to prevent forced growth. Malting operations are so under control that analytical figures can be more readily obtained for the finished malt, which are known to give best results in the brewery. Malt can be made cheaper, because large quantities can be manipulated in the apparatus as easily as smaller quantities.

What I claim and desire to secure by Letters Patent is:

1. An apparatus for treating grain in the production of malt comprising in combination a revolving drum whereby owing to the rotation of the drum the bulk of the grain continuously passing has a stream of grain continuously passing over its surface, and means for causing a stream of elastic fluid to flow across the surface of the bulk of the grain.

2. Apparatus for treating grain in the production of malt comprising an outer airtight casing, a rotatable perforated shell or drum, a cylinder located centrally within the drum, means for rotating the drum to cause the grain to continually fall or roll down and means for causing or inducing a current of elastic fluid to flow over the surface of the bulk of grain and thus through the falling grain substantially as specified.

3. An apparatus for treating grain in the production of malt comprising in combination, a revolving drum whereby owing to the rotation of the drum the bulk of the grain has a stream of grain continuously passing over its surface, means for causing a stream of elastic fluid to flow across the surface of the bulk of the grain in a direction opposite to said stream of grain.

4. An apparatus for treating grain in the production of malt comprising in combination, means for producing a continuous stream of grain across the bulk of the grain and means for causing a stream of elastic fluid to flow across the surface of the bulk of the grain.

5. An apparatus for treating grain in the production of malt comprising in combination, means for causing a continuous stream of grain to flow across the surface of the bulk of the grain, and means for causing a stream of elastic fluid to flow across the surface of the bulk of the grain in a direction opposite to said stream of grain.

6. An apparatus for treating grain in the production of malt comprising in combination, an outer air-tight casing, a rotatable perforated shell or drum, a cylinder located centrally within the drum, means for rotating the drum, to cause the grain to continually fall or roll down means for causing or inducing a current of elastic fluid to flow over the surface of the bulk of grain and thus through the falling grain, and movable partitions for enabling the effective capacity of the drum to be varied, substantially as specified.

7. An apparatus for treating grain in the production of malt comprising in combination, an outer air-tight casing, a rotatable perforated shell or drum, a cylinder located centrally within the drum, means for rotating the drum to cause the grain to continually fall or roll down, means for causing or inducing a current of elastic fluid to flow over the surface of the bulk of grain and thus through the falling grain, and means for controlling the flow of said current of elastic fluid.

In testimony whereof I affix my signature in presence of two witnesses.

ROBERT EDWARD CHICHESTER.

Witnesses:
ARTHUR WM. BYGRAVE,
ARTHUR FRANK MOWER.

Copies of this patent may be obtained for five cents each, by addressing the "Commissioner of Patents, Washington, D. C."